(12) United States Patent
Luke

(10) Patent No.: US 6,622,173 B1
(45) Date of Patent: Sep. 16, 2003

(54) AUTOMATIC MESSAGE PREDICTION SYSTEM USES MESSAGE UNIQUE CHARACTERISTIC FOR HANDLING MESSAGE TRANSFER TO REDUCE NETWORK TRAFFIC

(75) Inventor: James Steven Luke, Cowes (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,107

(22) Filed: Mar. 21, 2000

(30) Foreign Application Priority Data

Oct. 12, 1999 (GB) ............................................. 9924001

(51) Int. Cl.<sup>7</sup> ............................................. G06F 15/16
(52) U.S. Cl. ........................ 709/237; 709/224; 709/230
(58) Field of Search ................................. 709/237, 248, 709/230, 224; 713/176; 714/807; 370/419

(56) References Cited

U.S. PATENT DOCUMENTS 5,898,713 A * 4/1999 Melzer et al. ............... 714/807

6,273,622 B1 * 8/2001 Ben-David ................. 403/218
6,289,023 B1 * 9/2001 Dowling et al. ............ 370/419
6,327,656 B2 * 12/2001 Zabetian ..................... 713/176

FOREIGN PATENT DOCUMENTS

JP 2097154 9/1990 ........... H04L/13/18

* cited by examiner

*Primary Examiner*—Le Hien Luu
(74) *Attorney, Agent, or Firm*—A. Bruce Clay

(57) ABSTRACT

An automatic message prediction system operable in a communications system including a transmitter and a receiver is disclosed. The receiver receives at least a portion of a message and tries to identify from the message portion, a message previously received by the receiver. If successful, the receiver calculates a checksum for the previously received message and transmits the checksum as a prediction of the remainder of the message to the transmitter. On receipt from the transmitter of an indication that the prediction is correct, the receiver completes the message from the previously received message.

8 Claims, 4 Drawing Sheets

AUTOMATIC MESSAGE PREDICTION SYSTEM USES MESSAGE UNIQUE CHARACTERISTIC FOR HANDLING MESSAGE TRANSFER TO REDUCE NETWORK TRAFFIC

FIELD OF INVENTION

The present invention relates to an automatic message prediction system for reducing network bandwidth required by messaging systems.

BACKGROUND OF THE INVENTION

Communication between computer systems generally follows a protocol where data, for example the content of an email, is transmitted in packets. Messaging systems may also include functionality which:

- checks that all received packets which make up a message have been received;
- orders the received packets such that the original message is correctly re-constructed; and
- corrects errors at both a packet and a message level.

Traditionally, error correction software involves some form of checksum which reveals that an error exists and causes a request for re-transmission to be sent to the original transmitter. More advanced systems use multiple checksums to enable the identification of an individual bit which is incorrect such that the incorrect bit can be corrected.

In this respect, existing messaging systems aim to ensure the totally accurate transmission of an entire message. However, this approach results in the transmission and re-transmission of massive volumes of data and significantly increases network loads. For example, a Lotus Notes email system operates through the replication of messages between databases. At a user level, a local replica of the User's mail database is routinely replicated with a database located on the corporate database.

It is an object of the present invention to mitigate such problems.

SUMMARY OF INVENTION

Accordingly the present invention provides an automatic message prediction system operable in a communications system including a transmitter and a receiver, said receiver comprising: means for receiving at least a portion of a message from said transmitter; means for identifying from said message portion, a message previously received by said receiver; means for determining a substantially unique characteristic for said previously received message; means for transmitting said characteristic as a prediction of the remainder of said message to said transmitter; and means, responsive to receipt from said transmitter of an indication that the prediction is correct, for completing said message from said previously received message.

An important benefit of this invention is that there is no need for totally accurate prediction of the message, as an incorrect prediction will not result in an incorrect transmission. Similarly, if the receiver does not recognise a previously received message or its predictions are not accepted by the transmitter, the receiver simply awaits the complete transmission of the original message.

The invention can be implemented as an automatic message prediction proxy cooperable with an existing message system without the need to integrate directly into the existing system. Alternatively, it is possible to include the invention as an integral part of a messaging system.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
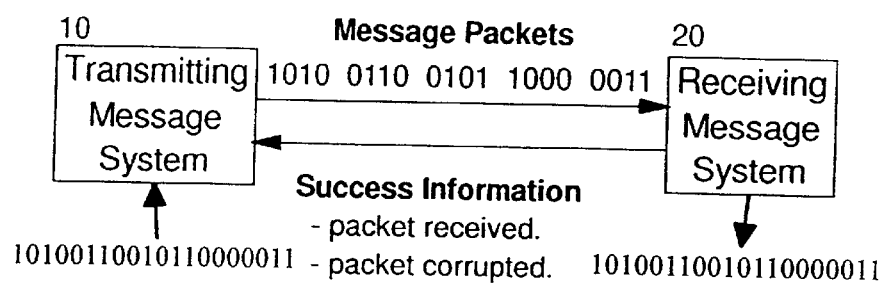
FIG. 1 shows a prior art messaging system.

Referring now to FIG. 1, which shows a conventional messaging system where messages are broken down into packets and sent by a transmitting system 10. The success or otherwise of the packet transmission is broadcast by a receiver system 20 such that packets can be re-transmitted if necessary.

Figure 2:
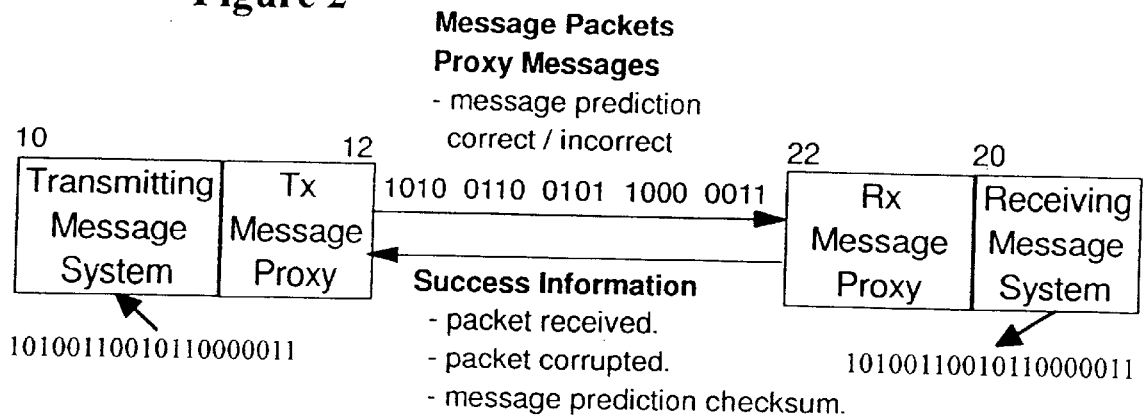
FIG. 2 shows a messaging system including the message prediction proxy according to the invention.

FIG. 2 shows a proxy system according to a preferred embodiment of the invention complementing such an existing message system 10, 20. In this case, a transmitting proxy 12, comprising a packet transmission buffer, is associated with the transmitting system 10; and a receiving proxy 22, comprising a packet receiver buffer, is associated with the receiving system 20.

The protocol for communicating within the existing message system needs to be extended to provide for communication of prediction checksums from the receiving proxy 22 to the transmitting proxy 12 and for communication of a transmitting proxy's assessment of prediction accuracy to the receiving proxy 22.

Figure 3:
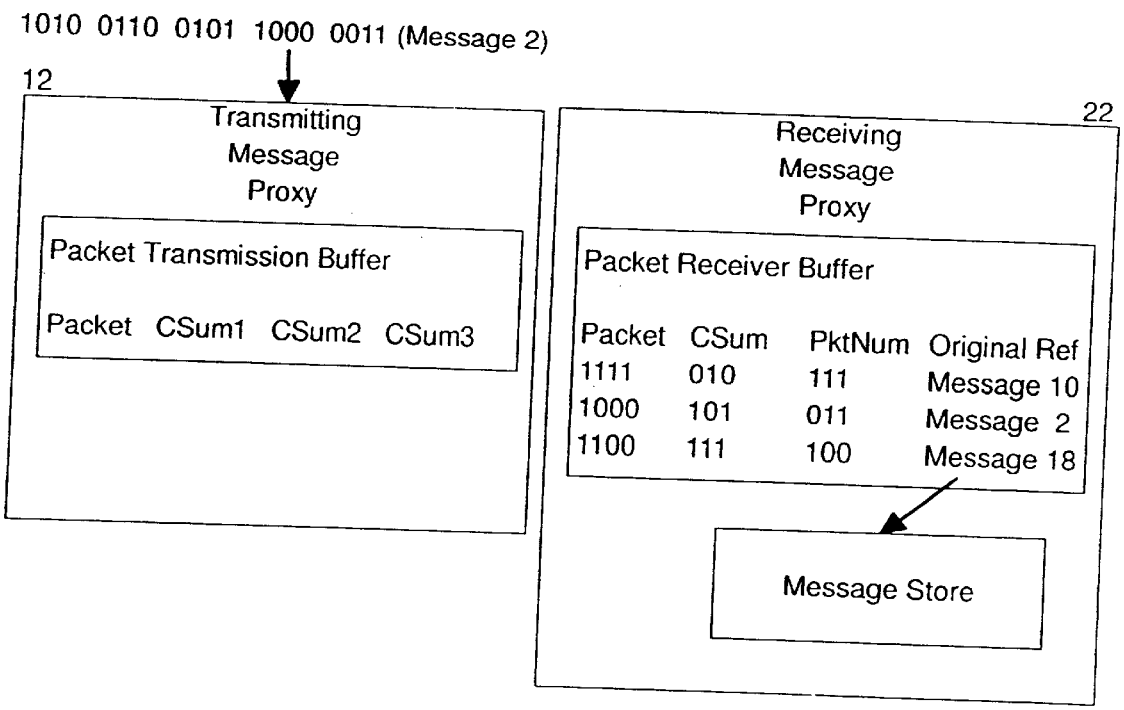
FIGS. 3 to 9 illustrate the operation of the proxy.

FIGS. 3 to 9 inclusive demonstrate the basic operation of the invention:

FIG. 3—shows Message 2 being passed from the transmitting system 10 of FIG. 2 to the transmission proxy 12 rather than directly to the receiving system 20 as in the prior art.

The receiving proxy 22 comprises a packet receiver buffer acting as a lookup table which associates previously seen packets with prediction checksums and contains a reference to the contents of the previously received message which is held locally in message store 24. PktNum represents the number of packets in the prediction associated with the checksum. For example, if the receiving proxy 22 receives a packet 1000, it predicts the occurrence of Message 2 and transmits a checksum, 101, which represents the following 3 packets which are stored locally and accessible to the receiving proxy 22.

It should be seen that the construction of the packet receiver buffer is best tuned to the operating conditions of the messaging system 10, 20. In the present example, where messages are assumed to comprise approximately 5 packets, a three bit PktNum is sufficiently large to cope with the number of packets the system is to make a prediction about. The system also needs to decide about the packet within a message it is to make a prediction. In the present example, the second packet of a message is chosen as the one on which to base a prediction and the checksum is used to predict the remaining packets.

It should be seen that the receiving proxy can be configured to match on more than one packet, so for large messages, the receiver might wait for a match of say, three consecutive packets, and then make a prediction based on the checksum of up to the following 20 packets. Alternatively, in a system dealing with shorter messages, predictions might be based on shorter components of the overall message.

Figure 4:
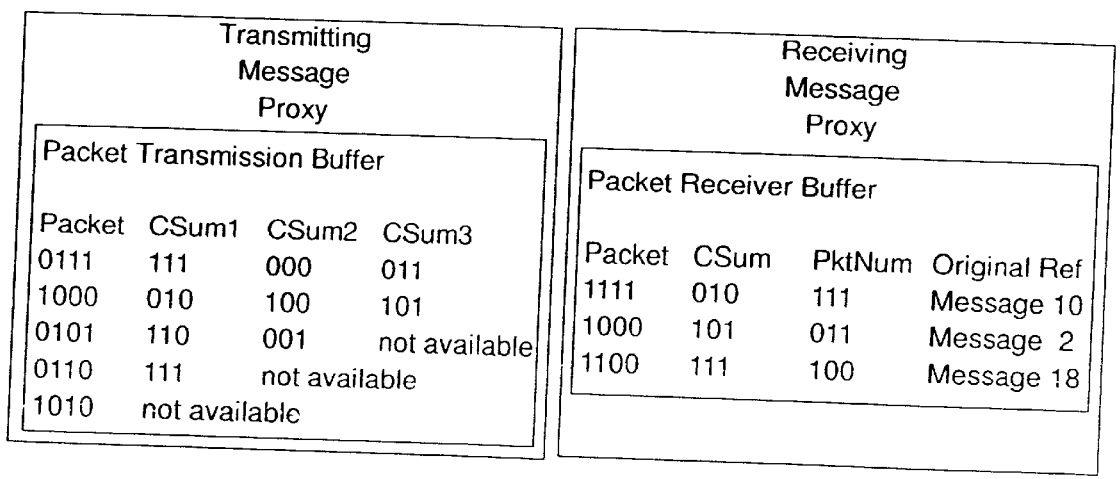

FIG. 4 shows the construction of the packet transmission buffer which acts a look up table which associates each packet to a series of checksums associated with subsequent packets. (In the example, it is assumed that the left most packet of Message 2 is transmitted last.) CSum1 represents the checksum for the next packet whilst CSum3 represents the checksum for the following 3 packets. In this respect a number of checksums, specified as a configuration parameter, are constructed which represent the following packets. It should be noted that some of the checksums cannot be generated in this case as there are no subsequent packets available.

Alternatively, the packet transmission buffer could be constructed with a single checksum and a remaining length associated with each message. So the first packet would have a checksum and an indicator that the checksum represents the remaining four packets of the message and so on. It should be seen that which this approach means the receiver proxy will only ever attempt to predict the entire, remaining packets of a message based on the initial packets received the invention is not limited to predicting the entire remainder of a message and can in fact be used to predict sub-sets of messages.

Figure 5:
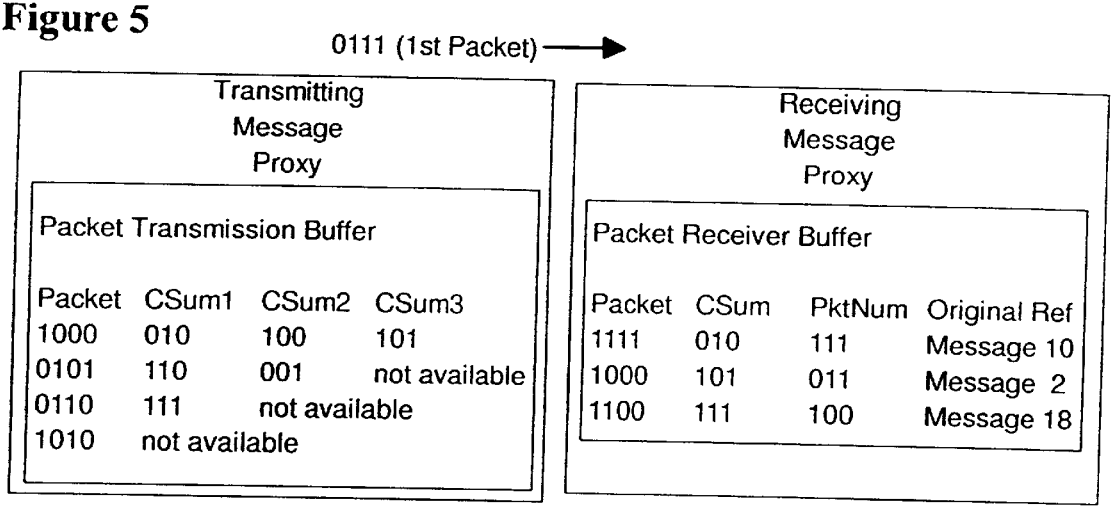
Figure 6:
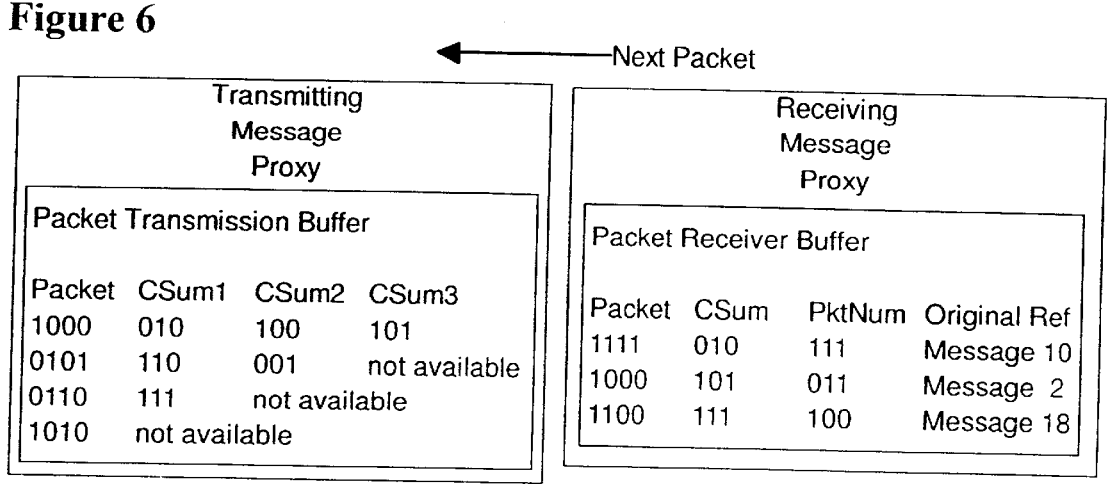

FIG. 5 shows the transmission of the first packet with its location in the transmission buffer being de-allocated. FIG. 6 shows a failure to identify a match within the packet receiver buffer for the first packet. As there is no match, the receiver proxy 22 simply either explicitly requests or waits for the next packet.

Figure 7:
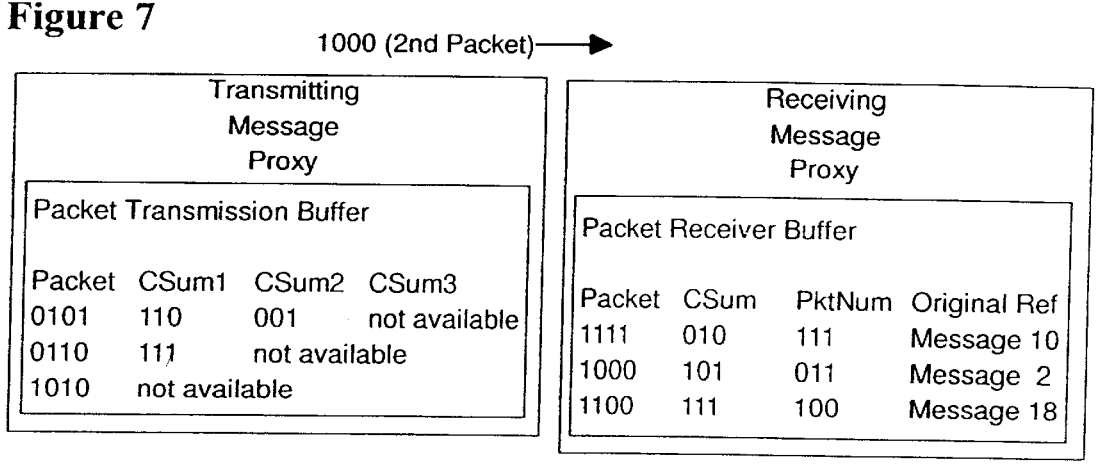
Figure 8:
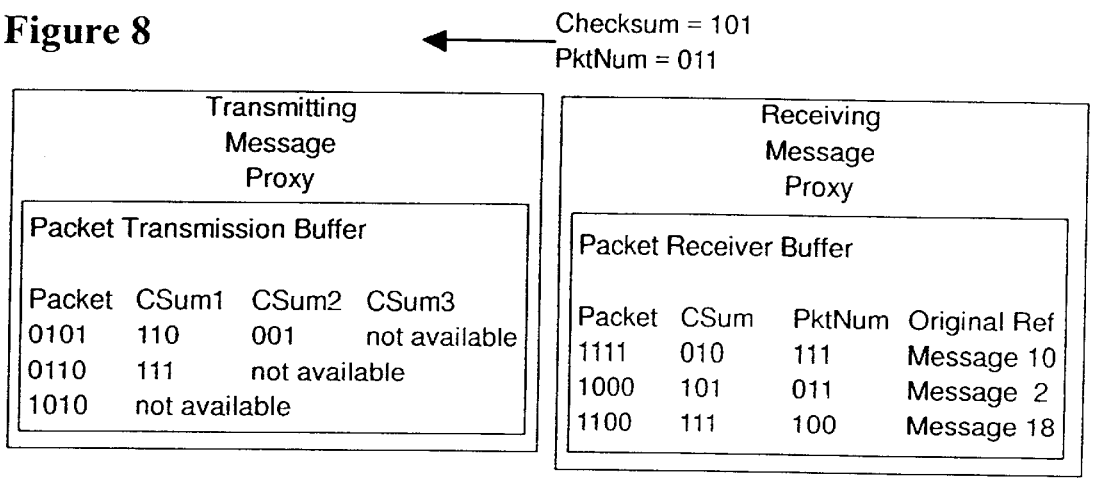
Figure 9:
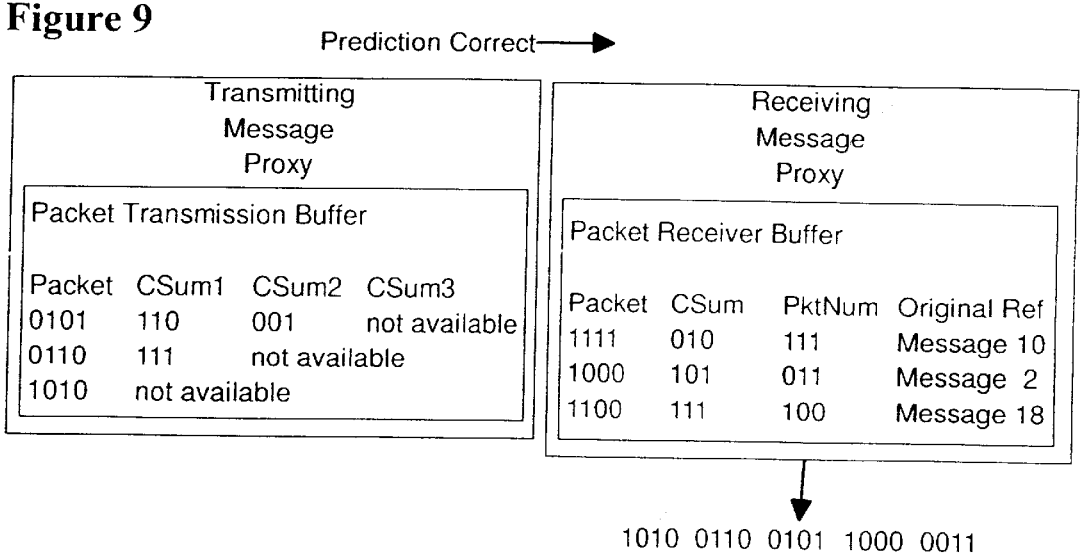

FIG. 7 shows the transmission of the second packet and FIG. 8 shows the response of the receiver proxy 22 to the receipt of the second packet. Having identified a match in the packet receiver buffer, the proxy 22 predicts an occurrence of Message 2 and sends the checksum together with the number of packets covered by the checksum. In FIG. 9, the transmitter proxy 12 verifies the checksum and transmits a prediction correct signal to the receiver proxy. The proxy 12 will not send further packets for Message 2 and as such is free to flush the packet transmission buffer of the unsent packets. On the other hand, the receiver proxy 22 is able to reconstruct the original message using a stored copy of at least the remainder of Message 2.

It is accepted that the generation of a transmission buffer does introduce a time lag into the messaging process, however it is envisaged that this system would be most applicable in non time critical applications, such as email. It should also be noted that, even in time critical applications, if the level of message redundancy is significant this approach could potentially reduce the overall latency in the system. In other words, where large messages are routinely re-transmitted there could be a time benefit through the invention.

The embodiment is largely dependent on the ability of the receiver proxy 22 to construct a repository of previously seen messages and the associated look up table within the receiver buffer. In its simplest form it is possible to analyse previously seen messages and identify those messages which represent maximum redundancy. These messages are the prime candidates for inclusion in the local store. For example, on receiving a request for information, a consultant may respond with the transmission of a presentation or document. Having observed this behaviour twice the proxy 22 generates a local copy along with the associated look up information. On all subsequent occasions the proxy predicts the entire message on receipt of the initial packet(s). Should the consultant send a variation of the presentation/document, the checksum will fail and the entire message will be requested.

The length of time a message spends in the local store may also be controlled, so that messages which are not received again within a limited time-span are flushed from the packet receiver buffer.

It will be seen that the invention is not limited to the sequential arrival of packets at the receiving proxy 22. If a packet which is logically later in a message arrives before a logically earlier message, and a correct prediction is made for such a packet, then it means if the prediction for the later packet is received at the transmitting proxy before any prediction for the earlier packet, the transmitting proxy 12 will cease transmitting the message no earlier than the later packet. The receiver proxy will in any case be able to construct the complete message from the remainder stored locally as soon as the logically earlier packet is received. Thus, the invention can be used across either dedicated lines or, for example, less deterministic networks such as the Internet.

It will also be seen that communication between the proxies 12, 22 need not be limited to running over the same line or channel as that of the conventional messaging—this could be done in parallel, where the resources are available.

Furthermore, the scope of the invention is not limited to messages of any given size or even to packetised messages. It will be seen that it is sufficient simply for the receiver to associate a partially transmitted message with a previously received message and to communicate this to the transmitter which can then decide if it wishes to continue transmitting the message.

In the preferred embodiment, the prediction comprises a checksum, it will be seen, however, that any characteristic substantially uniquely identifying a message can be used. The level of uniqueness of course depends on the criticality of the message contents.

What is claimed is:

1. An automatic message prediction system operable in a communications system including a transmitter and a receiver, said receiver comprising:

means for receiving at least a portion of a message from said transmitter;

means for identifying from said message portion, a message previously received by said receiver;

means for determining a unique characteristic for said previously received message;

means for transmitting said characteristic as a prediction of the remainder of said message to said transmitter; and means, responsive to receipt from said transmitter of an indication that the prediction is correct, for completing said message from said previously received message.

2. An automatic message prediction system as claimed in claim 1 wherein said transmitter comprises:

means, responsive to a correctly received prediction for a partially transmitted message, for transmitting to said receiver an indication that said prediction is correct and for ceasing transmission of the partially transmitted message.

3. An automatic message prediction system as claimed in claim 2 wherein said communications system is a messaging system and wherein said transmitter comprises a transmitting message proxy cooperable with a transmitting component of said messaging system to receive messages transmitted by said transmitting component; and said receiver comprises a receiving message proxy cooperable with a receiving component of said messaging system to relay completed messages to said receiving component.

4. An automatic message prediction system as claimed in claim 2 wherein said transmitter and said receiver are integral with a messaging system.

5. An automatic message prediction system as claimed in claim 1 wherein said unique characteristic comprises a checksum of the remainder of said message.

6. An automatic message prediction system as claimed in claim 5 wherein said prediction further comprises a measure of the remainder of said message.

7. A method operable in a communications system including a transmitter and a receiver for automatically predicting messages, comprising the steps of:

receiving at least a portion of a message from said transmitter;

identifying from said message portion, a message previously received by said receiver;

determining a unique characteristic for said previously received message;

transmitting said characteristic as a prediction of the remainder of said message to said transmitter; and responsive to receipt from said transmitter of an indication that the prediction is correct, completing said message from said previously received message.

8. A computer program product comprising computer program code stored on a computer readable storage medium for, when executed on a computing device, automatically predicting messages, the program code comprising:

means for receiving at least a portion of a message from said transmitter;

means for identifying from said message portion, a message previously received by said receiver;

means for determining a unique characteristic for said previously received message;

means for transmitting said characteristic as a prediction of the remainder of said message to said transmitter; and means, responsive to receipt from said transmitter of an indication that the prediction is correct, for completing said message from said previously received message.

* * * * *